(12) United States Patent
Fischer (10) Patent No.: US 11,360,489 B2
(45) Date of Patent: Jun. 14, 2022

(54) TRANSPORT SYSTEM, SELF-DRIVING VEHICLE AND CONTROL METHOD OF A TRANSPORT SYSTEM

(71) Applicant: INNOVATIVE DRAGON LTD., London (GB)

(72) Inventor: Herwig Fischer, Willich (DE)

(73) Assignee: INNOVATIVE DRAGON LTD., London (GB)

( * ) Notice: Subject to any disclaimer, the term of this patent is extended or adjusted under 35 U.S.C. 154(b) by 597 days.

(21) Appl. No.: 16/317,664

(22) PCT Filed: Jul. 14, 2017

(86) PCT No.: PCT/EP2017/067834
§ 371 (c)(1),
(2) Date: Jan. 14, 2019

(87) PCT Pub. No.: WO2018/011394
PCT Pub. Date: Jan. 18, 2018

(65) Prior Publication Data
US 2019/0286162 A1    Sep. 19, 2019

(30) Foreign Application Priority Data

Jul. 15, 2016 (DE) .................. 10 2016 008 800.1
Oct. 15, 2016 (DE) .................. 10 2016 012 366.4

(51) Int. Cl.
*G05D 1/02* (2020.01)
*B60L 55/00* (2019.01)
(Continued)

(52) U.S. Cl.
CPC ............ *G05D 1/0291* (2013.01); *B60L 53/80* (2019.02); *B60L 55/00* (2019.02); *B60R 1/00* (2013.01);
(Continued)

(58) Field of Classification Search
CPC .... G05D 1/0291; G05D 1/0088; B60L 55/00; B60L 53/80; B60R 1/00; B60R 21/0134;
(Continued)

(56) References Cited

U.S. PATENT DOCUMENTS 8,939,455 B1 * 1/2015 Terry .................... B62B 5/0069
280/87.051
2010/0256836 A1 * 10/2010 Mudalige ............... G08G 1/164
701/2
(Continued)

FOREIGN PATENT DOCUMENTS

DE    102014013585 A1 *  3/2016  ............ B60W 10/04
EP    1 569 183 A2        8/2005

*Primary Examiner* — Peter D Nolan
*Assistant Examiner* — Luke Huynh
(74) *Attorney, Agent, or Firm* — McGlew and Tuttle, P.C.

(57) ABSTRACT

The present invention relates to a transport system with a fleet of self-driving vehicles for transporting persons and/or parcels within a delimited area, a self-driving vehicle for use within such a transport system and a control method of a transport system with a fleet of self-driving vehicles. In order to create a transport system that facilitates low-cost and individual mobility for persons and/or parcels in city traffic in particular, a vehicle control system is proposed according to the invention with an onboard unit associated with the individual vehicle and a central computer, which is connected to all vehicles of the fleet, wherein the vehicle dynamics of an individual vehicle are regulated by the onboard unit and the navigation as well as the integration of an individual vehicle into the traffic is controlled both by the onboard unit and by the central computer.

14 Claims, 7 Drawing Sheets

(51) Int. Cl.
  *B60L 53/80*    (2019.01)
  *B60R 1/00*     (2022.01)
  *B60R 21/0134*  (2006.01)
  *B60R 21/055*   (2006.01)
  *B60R 25/24*    (2013.01)
  *B62D 39/00*    (2006.01)
  *G05D 1/00*     (2006.01)
  *G08G 1/00*     (2006.01)
  *G09F 21/04*    (2006.01)
  *G08G 1/16*     (2006.01)
  *G09F 9/33*     (2006.01)

(52) U.S. Cl.
  CPC ........ *B60R 21/0134* (2013.01); *B60R 21/055* (2013.01); *B60R 25/24* (2013.01); *B62D 39/00* (2013.01); *G05D 1/0088* (2013.01); *G08G 1/161* (2013.01); *G08G 1/164* (2013.01); *G08G 1/22* (2013.01); *G09F 21/048* (2013.01); *B60L 2220/44* (2013.01); *B60R 2325/103* (2013.01); *B60R 2325/105* (2013.01); *G05D 2201/0213* (2013.01); *G09F 9/33* (2013.01)

(58) Field of Classification Search
  CPC ....... B60R 21/055; B60R 25/24; B62D 39/00; G08G 1/161; G08G 1/164; G08G 1/22; G09F 21/048
  USPC .......................................................... 701/22
  See application file for complete search history.

(56) References Cited

U.S. PATENT DOCUMENTS

2016/0171894 A1* 6/2016 Harvey ................ G05D 1/0293
                                                    701/23
2016/0207418 A1* 7/2016 Bergstrom ............... B60G 3/06

* cited by examiner

TRANSPORT SYSTEM, SELF-DRIVING VEHICLE AND CONTROL METHOD OF A TRANSPORT SYSTEM

FIELD OF THE INVENTION

The present invention relates to a transport system with a fleet of self-driving vehicles for transporting persons and/or parcels within a delimited area, a self-driving vehicle for use within such a transport system and a control method of a transport system with a fleet of self-driving vehicles.

TECHNICAL BACKGROUND

Mobility has now become an irreplaceable necessity for quality of life, wherein a distinction should be made in principle between individual mobility—such as car, motorcycle, bicycle and similar—and collective mobility—such as bus, rail, scheduled flight and the like. These categories are currently subjected to a dynamic change, as the dramatic development of electric drives and of sensor systems and control systems makes autonomous driving, thus autonomous vehicle guidance, possible on all roads and will completely replace vehicle guidance by persons in the medium term.

In the established automotive industry, an evolution process is therefore to be observed, in which conventional car concepts with combustion engines are being transferred successively to electrically driven and self-driving cars. However, the changeover to autonomous vehicle concepts is in fact being unnecessarily delayed, because not only elementary basics of the vehicle architecture, the design, the ergonomics and the arrangement of all assemblies in the vehicle (packaging) are changing, but also all design and target parameters of the apparatus itself, such as, for example, depreciation times, service intervals, costs of use, degree of use, use characteristics, integration into traffic management, personification and identification between vehicle and driver and owner of the vehicle respectively.

Conventional passenger cars are bought with the aim of the most unrestricted and extensive utilization possibility, which is why shopping trips (with only one passenger), daily journeys to work (likewise with only one passenger) on the one hand and holiday and long-distance journeys on the other hand, in which the vehicle takes several persons and suitcases, are undertaken using the same car. Due to this universal use, a very poor adaptation to the respective mission profile results. For example, on 200 working days the vehicle transports a large and heavy car, just a single person with no luggage, with four empty seats and an empty boot, simply to have sufficient loading capacity for one holiday trip in the year.

Added to this is the fact that cars are regarded nowadays as prestige objects and therefore provided with greater luxury than is normally utilized.

Cars are actually used on average for just 5% of the time and accordingly stand as dead capital on standby for 95% of the time and require expensive parking space. On account of the use of combustion engines with the known disadvantages in wear caused by mixed friction of the many sliding movement contacts in cold starting, by high thermal stresses on account of the high temperature gradients and by the chemistry of exhaust gas post-processing, depreciations are calculated at 250,000 km. The product manufactured with a high energy and raw material outlay is subsequently scrapped.

For legal reasons, vehicle guidance by persons calls for many compromises in regard to the active visibility conditions for the driver outwards and the passive visibility conditions into the vehicle for identification of the driver, with the result of strong solar radiation through the glazing and thus a high energy input for air conditioning, which leads to significant range losses, especially in the case of battery-supplied drives.

In addition, autonomous vehicle guidance, ideally with active networking and car-to-car communication universally for all vehicle missions such as long-distance, motorway, traffic congestion and city traffic and driving on country roads, is very complex, and especially in the transition phase, in which autonomous vehicles and person-controlled vehicles are driving at the same time, safety requirements can only be met with difficulty.

As well as the problems described above, which relate to the conveyance of persons in congested urban areas in particular, it is to be observed that sales of goods by mail-order retailers are increasing worldwide and forecasts show an even further rise for the next few years. Due to sophisticated logistics systems, transport from retailer to customer is very efficient as far as the last distribution warehouse. However, the final stretch to the customer (last mile) is increasingly problematic using the known systems, such as delivery by person-controlled vehicles.

Delivery up to now takes place following fixed routes, so that delivery to end customers cannot take place at a previously arranged time, but rather when the driver reaches the delivery address on his route. In addition, delivery takes place during the day, when many customers are not at home on account of work. Due to this, multiple calls often have to be made on the customer, or after several failed attempts the customer him/herself must collect the goods from the distribution center or another issuing point.

Moreover, it is to be noted that the vehicle in the format of a small transporter cannot be properly parked in the many parking operations for the approx. 200 parcels per day, so that the driver is forced to park illegally on a lane of the road with hazard warning lights, which is associated with the known negative consequences for the flow of traffic in the city.

BRIEF SUMMARY OF THE INVENTION

The object of the present invention is therefore to create a transport system that remedies the aforesaid disadvantages and to create low-cost and individual mobility for persons and/or parcels in city traffic in particular.

This object is achieved by the transport system according to claim 1, the self-driving vehicle according to claim 3 and the control method of a transport system according to claim 32.

1. TRANSPORT SYSTEM

According to the invention, there is provided a vehicle control system with an onboard unit associated with the individual vehicle and a central computer, which is connected to all vehicles in the fleet, wherein the vehicle dynamics of an individual vehicle are regulated by the onboard unit and navigation as well as integration of an individual vehicle into the traffic is controlled both by the onboard unit and by the central computer. As well as the software and the computing capacity for vehicle guidance on board (onboard unit), a central processor unit is thus provided, which monitors and evaluates all or the majority of all journeys of the vehicle fleet on an ongoing basis and can thus undertake ongoing optimizations in the traffic routing, wherein the optimization targets are realized according to arbitrary criteria, such as shortest driving time, minimal energy consumption, relieving local routes, avoiding obstructions or circumventing local special events, for example.

The present transport system is to be distinguished from already known concepts of a fleet with self-driving vehicles in particular because in conventional automatic driving, control systems are provided that simulate an automatic driver and that monitor the environment by complex cameras and/or environmental sensors of every type. In contrast, the movement of an individual vehicle according to the present invention is substantially controlled by a central computer, so that a robot-like simulation of a driver is dispensable in large part. Although such systems also support the safety of the present vehicle fleet, far fewer control devices are necessary. Furthermore, traffic light systems, for example, are connected by radio or other cable-free communication connections to the individual vehicles of the fleet, so that stop and go signals are transmitted free of error and delay. The transport system described can therefore be integrated into the previously existing infrastructure of cities without a greater outlay.

According to a preferred configuration of the invention, it is provided that the vehicles of the fleet are connected to one another by car-to-car communication, wherein preferably only vehicles that are located within a radius of 100 m of the vehicle are connected to one another by car-to-car communication. In particular, the restriction of the car-to-car communication to the radius of 100 m saves computing capacity, because not all vehicles in the fleet exchange information with one another that is not necessarily relevant in the local area in which an individual vehicle is presently located.

Ideally the transport system according to the invention is implemented so that individual areas, sub-areas or routes of a city or municipality are served exclusively by this system. A maximum of transport capacity, transport speed, environmental relief and passenger comfort is thus achieved. Since the system can perform practically any transport task, the complete assumption of all mobility requirements is thus possible. For cases in which more than two passengers are carried, several self-driving vehicles can simply be requested.

For special tasks, such as the transport of disabled persons, transport of bulky goods or of several under-age passengers including carers, special vehicles of the fleet are provided, which have other passenger space sizes, but are otherwise compatible with the self-driving vehicles used according to the invention.

The system is also compatible, however, for mixed operation with conventional non-self-driving vehicles of all kinds, thus person-guided vehicles, buses and rail vehicles, although the maximal benefit or the maximal transport capacity is attained when the system is used exclusively in a selected area or on a selected route.

2. SELF-DRIVING VEHICLE

Analogous to the transport system according to the invention, the self-driving vehicle according to the invention has a vehicle control system with an onboard unit associated with the self-driving vehicle and a connection to a central computer, which is connected to all self-driving vehicles in the fleet, wherein the driving dynamics of the vehicle are regulated by the onboard unit and the navigation as well as the integration of the vehicle into the traffic are controlled both by the onboard unit and by the central computer. The self-driving vehicle according to the invention delivers the same advantages that were already described previously in respect of the transport system according to the invention.

Various preferred embodiments of the self-driving vehicle are described below.

According to a first advantageous configuration of the invention, it is provided that the width of the vehicle is smaller than 1.2 m, preferably smaller than 1.0 m, so that at least two vehicles can drive in parallel on a lane. The small gauge is an important constituent of the present invention and permits two vehicles to be able to drive next to one another on a lane of the road. Lanes in the city center are between 2.75 m and 3.75 m wide, so that with a vehicle width of the self-driving vehicle of 0.8 to 1.2 m, two vehicles can drive safely adjacent to one another and can in addition avoid a self-driving vehicle standing at the verge, which is just picking up or setting down passengers, for example.

Attempts to decongest city traffic by designing vehicles with passengers sitting next to one another to be very short, as in the case of the Smart, for example, prove to be virtually completely futile, as only one vehicle can drive per lane and at a speed of 50 km/h with the prescribed safety distances of 25 m to the front and rear, the saving in traffic area is already marginal. The safety distances and the vehicle length produce 52.6 m in total, which compared with a 5 m long vehicle with a corresponding length of 55 m (including safety distance) is virtually infinitesimal.

In contrast, the self-driving vehicles according to the invention double the utilization by the parallel travel adjacent to one another, additionally prevent the tailback due to vehicles stopping at the verge and can optionally be operated even with a tight spacing in the direction of travel in the long term on account of the increased precision and safety of the autonomous vehicle guidance, so that an increase in vehicle density or vehicle throughput by the factor of 2 to 2.5 results. It is to be expected in the long term that the safety distances can be reduced by up to 70%, which increases vehicle density by as much as the factor of 6 to 7. The vehicles according to the invention can be driven in block operation, i.e. instead of the stipulation of a time spacing when starting up at traffic lights, such as 1.8 seconds, for example, according to the German Road Traffic Act, the vehicles standing adjacent to and behind one another can drive off at the same time, which is associated with a significant time gain. Then, as the speed of the vehicles increases, a constant spatial interval of e.g. 2 m can be integrated at any speed, as reaction times between the vehicles are eliminated.

According to another preferred embodiment of the invention, it is provided that, to compensate for lateral forces in journeys on curves, the vehicles have an actuation system and control that permit tilting of the vehicle parallel to the longitudinal axis. Vehicles with a small width or with a small spacing of the wheels have limited safety against lateral tipping in curves and in the event of a side wind, especially if the passengers are to sit upright and comfortably and thus the center of gravity of the laden vehicle is comparatively high. The advantageous tilt kinematics, which permit a rotation about an axis parallel to the direction of travel so that in any driving state the residual overturning moment is virtually zero or disappears, ensures high traffic safety. Ideally a vehicle with such tilt kinematics has three or preferably four wheels.

In a vehicle with four wheels, four-wheel steering is preferably provided, wherein the vehicle can preferably drive both forwards and backwards at an identical speed and with the same autonomous vehicle guidance. The occupants sit opposite in such a vehicle, wherein transverse forces are eliminated due to the tilting technology, so that the danger of travel sickness is minimized even for the person riding backwards. Due to the fact that the vehicle direction does not satisfy any preferential direction and the self-driving vehicle can drive forwards in both directions at the same speed, no turning maneuvers are required to reverse the direction of travel, which makes swift integration of the self-driving vehicle into traffic possible when merging.

It is preferably provided that the self-driving vehicles are electrically driven, wherein it has proved advantageous that the electric drive motors are arranged in the wheel hubs of the vehicle. In an embodiment of the self-driving vehicle with four wheels, four electric wheel hub motors are provided and are electrically operated. The batteries required for this are located in the chassis between the wheels and underneath the seats, so that a flat floor is created in between, which is at the height of the kerbside, so that practically ground-level boarding from the pavement is facilitated.

According to another preferred configuration of the self-driving vehicle, it is provided that the vehicles have opposing seats, wherein the seats are preferably spaced at such a distance that room for luggage being transported is arranged between the opposing seats. The vehicles preferably have a chassis and a split bodywork structure, wherein the bodywork parts are movable in a longitudinal direction, so that when the bodywork parts are moved in opposite directions an opening is created for the boarding and alighting of persons. In other words, the self-driving vehicles consist of a chassis with a level floor between the wheels and the passenger seats are located at the respective ends of the chassis. The bodywork structure is raised in the middle and consists of two halves, which are moved apart in a longitudinal direction by actuation and thus release an opening in the middle, which facilitates the boarding and alighting of the occupants. Alternatively hinged doors or sliding doors are provided on both sides of the chassis that always open on the right side of the vehicle, so that the inside of the vehicle does not get wet even in the event of rain and alighting is possible on the side facing the pavement and the passenger cannot alight into an adjacent lane.

The self-driving vehicle preferably has a padded safety crossbar, which is attached to a structural part of the vehicle and can preferably be transferred automatically to a position in which the crossbar holds an occupant in the event of an accident.

According to a particularly preferred embodiment, it is provided that the padded safety crossbar is activated by an early accident recognition system, so that the safety crossbar does not represent an obstruction for the passenger in normal, accident-free traffic. The padded safety crossbar is thus guided along by actuation on stable vehicle structures to each occupant, the contact is detected by sensor and the safety crossbar is then moved back a few centimeters to a comfortable distance. This crossbar fulfils the task of a lap belt of a safety belt and is equipped in another preferred embodiment with an airbag. A shoulder belt, on the other hand, is not required, as there is sufficient free space in front of each occupant, so that an impact to the head in high longitudinal accelerations due to accidents is excluded.

Furthermore, the self-driving vehicles according to a preferred embodiment of the invention have a battery changing system. In the event of a low energy state, the self-driving vehicles according to the invention initially only accept routes on request that can also be reached with the battery capacity, and if this falls below a defined minimal value, drive automatically to a battery changing station. In addition or alternatively, all vehicles are connected in the waiting positions automatically by plug or inductively to the urban power grid and act as battery buffers to equalize variations in grid loading (balancing energy) and as emergency power units. On account of the limitation and specialization of the transport system to an inner city area, an infrastructure matching this is to be installed with moderate resources.

It is preferably provided that the passenger cabin of the vehicle is semi-mirrored, so that the view from inside outwards is free, while the view from outside inwards is blocked. A feeling of space that is perceived subjectively as positive is facilitated by this in the comparatively narrow interior of the self-driving vehicle, because the upper part of the vehicle is largely glazed, so that the occupants have a free view all around. In order nevertheless to avoid the known heating due to solar radiation, the glazing is vision-proof from outside due to one-way mirroring. In another embodiment, additional parts of the glazing are provided with LED, OLED or other displays, which are transparent from inside and from outside show information or advertising. It is therefore provided according to a preferred embodiment of the invention that information and/or advertising directed outwards is reproduced on a display on the external surface of the passenger cabin without blocking or impairing the view of the passengers from inside outwards. It is also provided that advertising directed inwards to the occupant is integrated in a manner optically or acoustically adapted to the route. The passenger's attention is drawn e.g. to sights, shops, restaurants etc., which the route passes. In a particular embodiment, this infotainment system is also capable of dialogue, so that the passenger can e.g. play the menu of a restaurant on the route on demand.

Preferred embodiments of a self-driving vehicle are described below that are substantially related to the delivery of parcels.

According to a first configuration of the present invention relating to this, it is provided that the self-driving vehicle has a system of individual boxes of different or identical size, which each contain only one parcel or only the shipment for one customer and are joined together by detachable connection means to form a total transport batch. The boxes are preferably connected detachably to one another by a form-fit system of spigots and recesses. In this case the dimensions of the boxes preferably produce an integral matrix system, so that boxes of different sizes can be joined into blocks without gaps and of a linear external contour. In other words, for optimal utilization of the loading volume available and for automation of the delivery to customers, instead of a cargo space with fixed walls or rigidly fixed individual compartments, a system of boxes of various sizes is proposed, the dimensions of which originate integrally from one another and which can thus be assembled into a matrix. In the distribution center, after the routes have been established, the parcels are placed into individual boxes, which fit comparatively precisely and are preferably manufactured cheaply from plastic, and then the boxes are combined into a large total package (total transport batch), with which the loading volume of the vehicle according to the invention can be optimally utilized. To this end the boxes have recesses on the outer sides, which engage in one another on joining of the boxes. In the case of major customers, such as mail-order retailers, for example, packaging can take place directly in the corresponding boxes, so that renewed redistribution or secondary packaging is no longer necessary and can be dispensed with.

The total package (total transport batch) can thus be optimally assembled using an optimization program and the position of the individual parcels and boxes can be logged, so that at the destination the matching parcel can be reliably assigned.

According to another preferred embodiment of the present invention, it is provided that the boxes have a cover, which can be opened by way of a key accessible from outside. The cover can further preferably be latched at different depths of the box via a tooth system. The cover thus has a lock, which can be opened by a universal key. This opening process is executed by a robot arm or an xy-plotter controller, which is or are mounted on the vehicle, as soon as a security check has been concluded positively, meaning after the target customer has been unambiguously identified and is standing in front of the vehicle. The cover of the box and only this cover is then opened and the goods can be removed by the customer and acknowledged if applicable.

The boxes have a cover on the external sides, which is secured by a simple locking. In a particular embodiment of the present invention, this cover can be latched at various depths of the box, for example by a tooth system, which is mounted on the inner walls of the box and in which a counter-tooth system in the cover engages. The goods transported can be secured against rattling by a deeper position of the cover in the box.

According to another preferred configuration of the present invention, it is provided that the cover contains a hollow chamber, which can be used as another chamber for goods that do not require the entire depth of the box, wherein it is preferably provided that a closure system unlocks the cover and hollow chamber in one direction of rotation and in the other direction of rotation opens the cover for access. In this particular configuration the cover is hollow and has an increased depth, so that the assembly space of the box, which cannot always be optimally adapted in depth on account of accessibility problems, can be subdivided once more into two individual spaces. In this case the locking mechanism is executed so that when the key is turned to the left, the entire hollow body is withdrawn and releases the space underneath and when turned to the right only the cover of the hollow body is opened.

According to a preferred configuration of the present invention, it is provided that the boxes for transport routes to the end customer and/or for transport routes to the retailer and/or to the delivery warehouse can be used as packaging, so that secondary packagings are avoidable. Specifically it is provided according to an optimal expansion stage of the system that the known secondary packagings of cardboard and the associated linings for securing the goods with polystyrene foam parts, flakes or other inserts completely disappear and instead the described boxes can be used alone instead of a cardboard box in a reusable process. This means that the manufacturer packs the goods ready for dispatch to the retailer in the matching standard box and thus dispatches it in a container reuse system, which can even be stacked on the intermediate transport in a space-saving matrix arrangement.

Furthermore, it is preferably provided that the boxes contain one or more inflatable chambers, which are inflated after the box has been filled with the goods to be transported and following closure of the cover and are deflated on opening the cover, so that the goods are secured against slippage and rattling. Goods of varying size and geometry can be fixed in the boxes secure against rattling and damage by this, because the goods are protected by the air bubble on all sides. The transport is thus not only secure, but environmentally unfriendly secondary packagings and protective packagings, which the end customer does not dispose of in a sorted manner and which are inconvenient for the customer, are completely eliminated. On opening of the box by the automatic system in the vehicle, the air in the protective bubble escapes, moreover, so that it is also recognizable for the customer by this noise that the transport has taken place safely protected against shocks, dirt and moisture.

Favoring a secure assembly of the blocks, it is provided according to a preferred configuration of the invention that the assembled blocks of several boxes are held and secured by way of a frame and/or a strap. The frame and/or the strap are locked at the ends following wrapping and the total package (total transport batch) of several boxes is attached securely on the vehicle.

The self-driving vehicle preferably has a blocking system in particular for the delivery of parcels, so that the boxes can only be opened after proof of identity has been established, in particular following checking via a mobile radio signal, a transponder, an NFC signal (near-field-communication), an RFID signal, an input code, a fingerprint scan or an eye scan or face scan, wherein there is arranged on the vehicle for this purpose an input apparatus, via which the presence of the addressee to accept the delivery can be established. It is further provided that the customers are informed by means of electronic information, such as an SMS, e-mail or by app in particular, about the scheduled delivery time, wherein additional information about an alternative delivery address and about the current position of the vehicle is provided. The self-driving vehicle hereby facilitates the delivery and receipt of parcels and/or goods at any destinations. In other words, after agreeing a time (by e-mail, SMS, telephone, app or other communication channels) with the individual customers, the vehicle will determine an optimal route by a corresponding computer program and coordinate the loading process for this. Before the arrival of the vehicle at the addressee's door, the customer is then informed, which can likewise take place in turn by e-mail, SMS, telephone, by app or other communication channels and the customer goes to the vehicle to receive his parcel. It must be ensured for this that the customer has access only and exclusively to his parcel. This can be ensured by communication with his mobile telephone and the delivery vehicle by entry of a password or a code in a terminal fitted in the vehicle or by a QR code, NFC (near-field-communication) between mobile phone and vehicle or by RFID scanner, fingerprint scan, transponder or other identification verification method. On positive verification of identity, access must be guaranteed to the relevant parcel and only to this. This is achieved by individual boxes with their own access, into which the total loading volume is divided. However, this solution is initially not very space-saving, as the parcel sizes vary sharply and thus large boxes often only contain small parcels.

Another preferred configuration of the present invention is geared to the fact that a simultaneous exchange of boxes and the battery of the vehicle is provided. For this purpose the vehicle is equipped with exchangeable batteries, so that on return of the vehicle to the distribution warehouse, not only are the empty boxes exchanged for filled boxes, but at the same time or preferably in the same mechanical process the batteries are exchanged for recharged ones.

It is further preferably provided that the self-driving vehicle has an external camera, which in the event of disturbances or misuse or attempted theft takes photos and/or videos of the environment and forwards the data recorded to a central office, where the recordings are evaluated and suitable countermeasures can be initiated.

The description below depicts how the overall delivery process proceeds with the self-driving vehicles according to the invention:

First the customer is informed by e-mail, SMS, app etc. of the time after which his order can be delivered and the customer selects likewise by e-mail, SMS, app etc. a time interval within which he will be available at the delivery address and can accept the delivery.

Following these time stipulations and the automatic route selection according to efficiency criteria, an optimal goods placement is designed in a computer logistics program. The corresponding boxes are joined together for this and the vehicle is loaded together with charged batteries.

The vehicle departs autonomously and can roll through the traffic quickly on account of the small gauge and stop at the edge of the road at any time, rolling on slowly tight to the verge without having to merge again if delivery addresses lie close to one another. In a special implementation the vehicle travels both forwards and backwards, so that it is always ensured that the customer can receive his goods on the side facing the pavement.

Shortly before arriving at the respective destination, the customer is informed afresh by e-mail, SMS, app or similar and is called to the vehicle on eventual arrival at the destination in front of the customer's door. The vehicle waits for this for a set period before undertaking the next delivery if the customer does not appear and noting the delivery process as "not at home".

After verifying the access authorization electronically, by data radio, by QR, by key code or similar, the robot arm is set in motion and opens the relevant cover of the box and the customer removes his goods.

In special cases he can also place a goods consignment with a separate request. The system allocates a suitable box for this in terms of size, which is free and essential. The data protocol of this consignment takes place like the removal by mobile radio or by keyboard in the terminal.

In a preferred implementation, the vehicle according to the invention is executed with a flat, low-lying floor between the wheels and has a center frame, which divides the vehicle into two halves at full height. The assembled box blocks are placed laterally to the right and left of this frame. On top of the frame is the robot arm, which can be pivoted left or right and located on which is a gripper with a key for the covers in a radially variable position, so that it is possible to move to the position for opening the cover of each box. Alternatively to a robot arm, a vertical or horizontal shaft with a linear guide can be used as a guide for the mechanism to open the covers.

As a whole it is to be stated that the self-driving vehicles according to the invention are specialized for use in city center traffic, wherein the maximum speed is limited to 70-80 km/h and thus the mapping, the central control system, the car-to-car communication and the energy supply are executed locally for a limited area and thus the outlay is significantly reduced.

The vehicles thus defined drive completely autonomously and are not individually owned and thus represent a new mobility class with which the gap between individual transport and public or collective transport is closed.

The size of the vehicles according to the invention is optimized according to the occupancy statistics, which show that 1.1 to 1.3 persons are on board on average. The self-driving vehicle according to the invention is thus designed for two persons, so that more than 96% of all transport tasks can be carried out using the self-driving vehicles.

The degree of utilization of these vehicles, which remain on call continuously, is then well over 70% in contrast to the car at 5%. The demand for parking space and the traffic searching for parking places are thus a thing of the past.

In short-distance transport, the proportions and thus the significance of boarding and alighting are disproportionately higher, so that this share of usage is accorded particular importance.

It is known from traditional taxis in city-center operation that the traffic is negatively affected by their operation due to the fact that a driving lane is blocked when passengers are boarding and alighting and thus the following traffic becomes congested. Since billing with a receipt and transferring luggage from the boot takes up a relatively large amount of time, these processes are proportionately a heavy burden on the traffic flow.

So that no lane is blocked during boarding, the self-driving vehicle according to the invention is preferably a narrow single-track vehicle. The vehicle thus offers space for two persons sitting opposite as well as space for two cases, which are in the onboard luggage format of the airlines and can be stood on the floor between the persons. Awkward access to a separate boot is thus eliminated, which is associated with the aforesaid advantages.

3. CONTROL METHOD

According to the inventive control method, it is provided that a person can request a self-driving vehicle preferably by mobile phone, so that an optimization and management program as an interface between the onboard unit and the central computer calculates the journey. In this case the current location of the requesting person is preferably detected and taken into account when determining the route.

Depending on the route it is determined whether the battery of the vehicle must be charged and/or exchanged in advance. Following the journey, it is preferably provided that the vehicle stops at the ideal waiting position as a function of the time of day and day of the week, any construction site and/or special event existing until the self-driving vehicle is requested again. In order to prevent persons other than the requesting person from using the requested vehicle, it is preferably provided that the vehicle booked is released by the requesting person by identification.

In other words, the control method according to the invention solves the problems underlying the invention in that the call for the vehicle, the booking and the communication of the destination to be headed for are made by mobile phone. Ideally the location of the passenger is already communicated automatically by GPS on booking, the vehicle that is available most quickly is determined by the central control system, the estimated arrival time is returned and the customer can continue to move on foot, as the requested vehicle now monitors his location on an ongoing basis. So that the booked vehicle cannot be taken by third parties, the doors only open when the requesting person has been identified by mobile phone.

Billing for the completed journey likewise takes place automatically by mobile phone at the destination, so that the turnaround time is comparatively short. Boarding and alighting takes place in the center of the vehicle, wherein the vehicle halves of the upper bodywork parts move to the front and rear by actuation, so that the passengers can rise to full standing height from the seat and comfortably alight. The narrow implementation permits alighting or boarding to the left or right depending on the traffic situation, by only one step in both cases, so that the sliding sideways across the back seat to the pavement side that is to be observed in normal taxis is eliminated. The luggage does not have to be lifted over loading sills, but stands barrier-free on the vehicle floor at pavement level.

The use of the mobility system by the requesting person proceeds according to the following scheme:

The passenger opens special software on the mobile phone (app) and enters his destination or retrieves it from his database. A call is thus activated automatically to the central office or central computer, his phone number, location and credit rating are identified and the nearest free self-driving vehicle as well as its journey time to pick up the requesting person and the journey time to the destination and the fare are calculated and transmitted to the requesting person. It is also determined whether the electrical energy in the selected vehicle is sufficient to complete the whole journey.

The selected self-driving vehicle then moves off and finds the requesting person, who can change his location arbitrarily in this case, so that the requesting person does not have to wait in unattractive locations, for example. As soon as the requested vehicle has reached the location of the passenger, a message appears on the mobile phone and a signal in parallel on the outside of the vehicle. The vehicle halts in the vicinity of the requesting person and following successful identification opens the bodywork. Alternatively the identity of the requesting person can be verified inside the requested vehicle and any unauthorized occupants are rejected or the self-driving vehicle refuses the journey. The "taxi theft" that is common in New York, for example, is avoided by this.

Depending on the location of the destination, the self-driving vehicle now sets off forwards or backwards and merges autonomously into the traffic. The route is optimized and monitored at regular intervals both by the onboard unit and by the central computer.

On arriving at the destination, the self-driving vehicle according to the invention halts at the edge of the road without blocking a lane and opens the exit, so that the person can leave the vehicle on the pavement side. The person receives the bill for the completed journey via his mobile phone bill to home. The GPS movement log, for example, can be used as proof of performance. Following exit from the vehicle, a photo is taken automatically of the vehicle interior using a wide-angle lens and is archived, in order in the event of vandalism or other soiling to be able to hold the relevant person responsible.

Finally the self-driving vehicle drives either to the next customer or for a battery change or to a holding position that has a charging plug, or is distributed in the urban district controlled by the central software in such a way that, viewed statistically, journey times to the expected request are minimal depending on the time, season, trade show or other local boundary conditions.

4. CONCLUSION

As a result, significant advantages in the cost/use ratio are created by the inventive transport system, the inventive self-driving vehicle and the inventive control method of a transport system, because

- the use of existing traffic areas and their transport key performance indicator (persons km/h) is increased by up to a factor of 7,
- following an adaptation of traffic routes to this system, which involves very low investment costs, even parking spaces and one-way street guidance can be adapted and converted to bidirectional carriageway areas,
- traffic light settings can be better optimized,
- the degree of utilization of the vehicles is increased by a multiple and thus the specific capital commitment costs are reduced by analogy,
- the service life of the vehicles is increased and the depreciation costs are thus reduced by a factor of 3 to 4,
- the direct vehicle costs are significantly reduced on account of specialization and the reduction in outlay and in the unused or rarely used capacity thereby achieved,
- the service costs fall significantly,
- the energy costs, energy use and environmental pollution fall significantly,
- the multiple use of the battery as drive for the vehicles and as grid balance substantially improves cost efficiency and
- the costs for energy for air conditioning are substantially reduced, because the interior of the vehicles according to the invention is mirrored outwardly.

In addition to the cost reduction, clear advantages arise in environmental pollution and comfort, because

- the local emission values on the vehicle are eliminated entirely,
- the emissions in the power plants are not relevant, but rather on account of the decoupling timewise of energy demand and time of charging, the charging processes can be supplied virtually fully and with renewable energy,
- the contributions of the vehicle batteries to the grid balance improve the ecological and economic balance,
- local heat and noise emissions are eliminated,
- transport safety is increased and
- the time consumed and the traffic area demand for traffic searching for parking spaces are eliminated and transport convenience is substantially improved, because the advantages of collective mobility are associated with the advantages of individual mobility.

BRIEF DESCRIPTION OF THE SEVERAL VIEWS OF THE DRAWINGS

Specific embodiments of the present invention are explained below by means of the figures. In these, Fig. 1a, b show a self-driving vehicle for transporting persons without bodywork.

DETAILED DESCRIPTION OF THE INVENTION

Figure 1A:
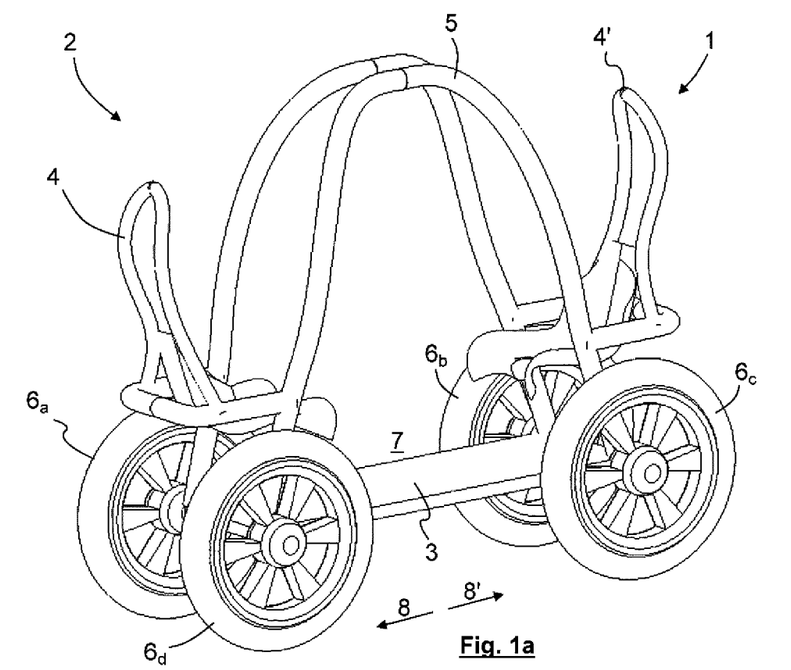

A central element of the present invention relates to the self-driving vehicle, which in the context of the present transport system drives autonomously in a fleet of self-driving vehicles and is designed to transport persons and/or parcels. FIGS. 1a, b and 2a-c show such a self-driving vehicle 1, which is designed for the transport of persons. For this purpose the vehicle 1 has a chassis 2 with a level floor 3, on which two opposing seats 4, 4' are arranged, and a frame structure 5, which can be designed for safety reasons and as a precaution as a roll bar. The self-driving vehicles 1 depicted have four wheels 6a-6d, which are arranged underneath and laterally offset to the seats. While the space 7 between the seats is configured as a luggage stowage area, there are arranged underneath the seats 4, 4' electronic units (not depicted), in particular the onboard unit, rechargeable batteries, control units and similar. Likewise not depicted are the electric wheel hub motors, which are designed so that the self-driving vehicle can drive forwards and backwards, thus in arrow direction 8, 8'.

Figure 1B:
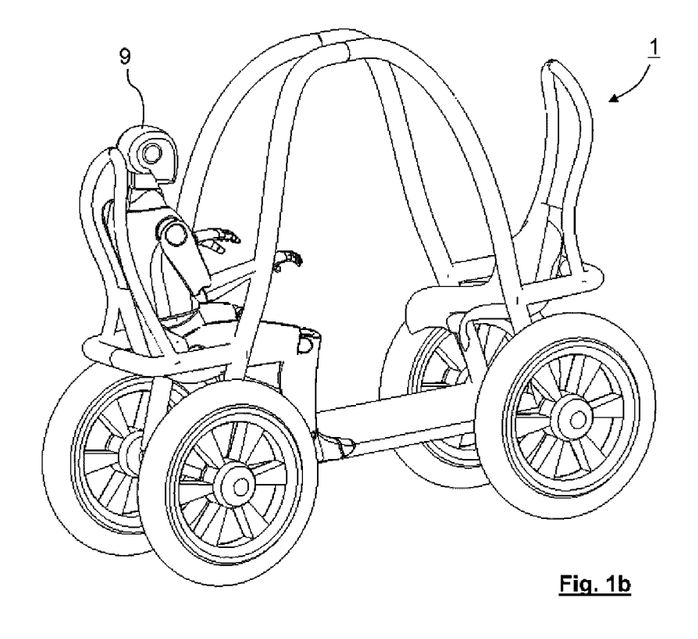

FIG. 1b shows the same vehicle 1 with a person 9 sitting on one seat.

Figure 2A:
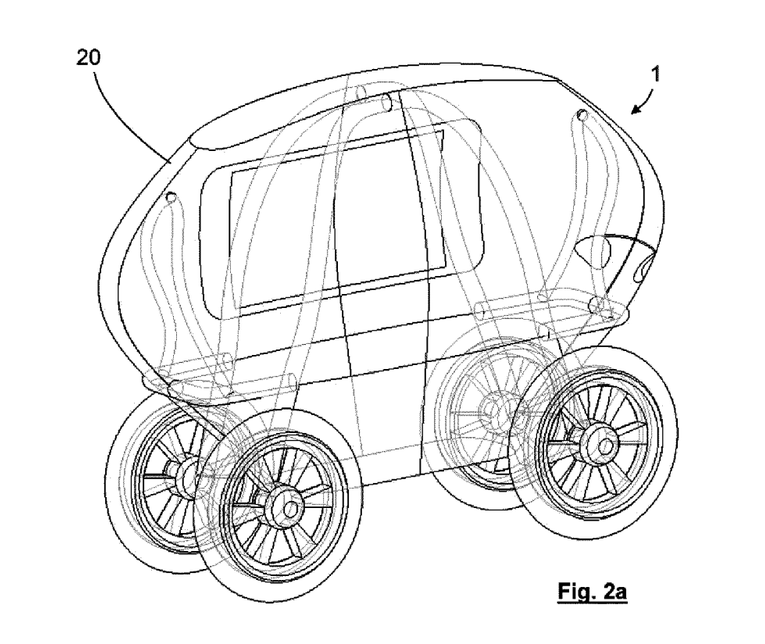
FIG. 2a-c show a self-driving vehicle for transporting persons with bodywork.
Figure 2B:
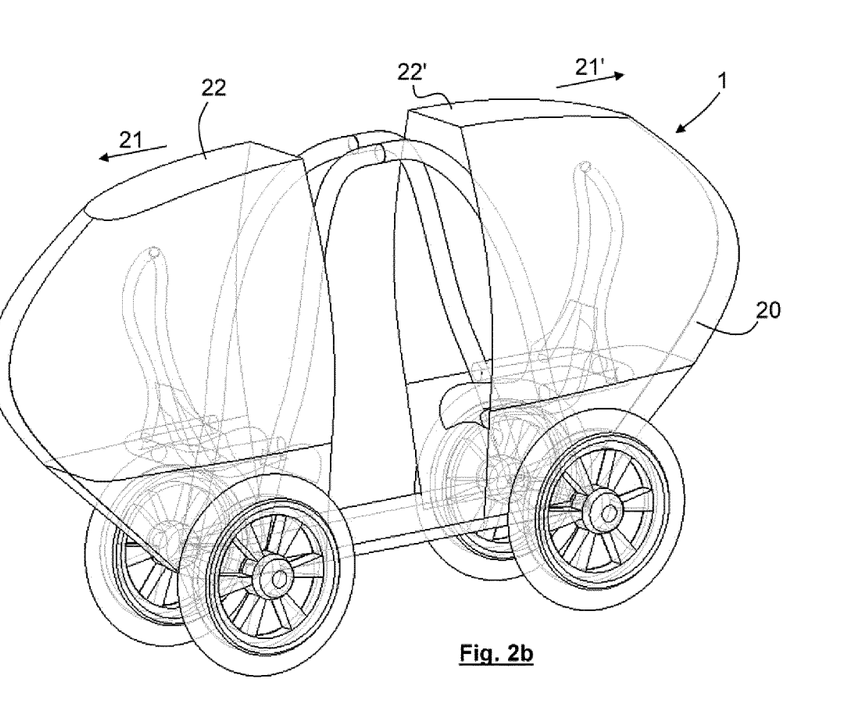
Figure 2C:
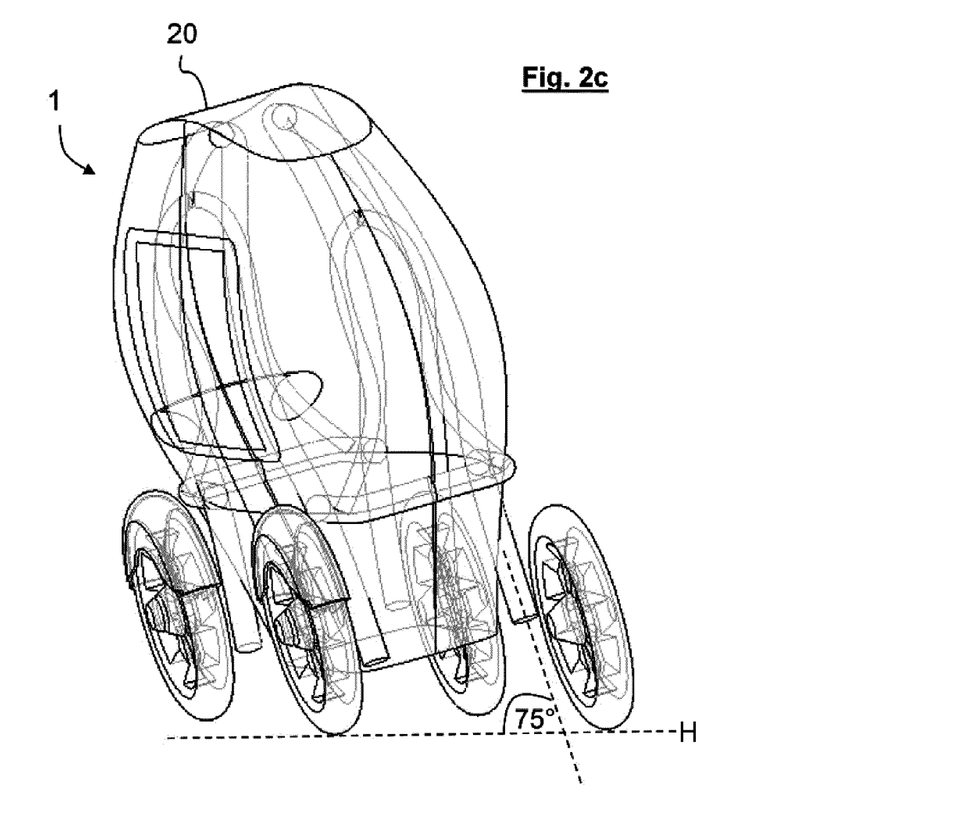

FIGS. 2a-c show the same vehicle 1 with bodywork 20, which consists of two bodywork halves 22, 22' that are movable relative to one another in arrow direction 21, 21'. For the boarding and alighting of persons, the bodywork halves 22, 22' are moved outwards and therefore open the passenger compartment.

Alternatively a conventional door can be provided, from which the passengers can exit the bodywork and thus the self-driving vehicle. The flat floor 3 of the vehicle 1 and the preferred overall height of the vehicle of approx. 1.8 m permit comfortable boarding. In order to ensure a pleasant climate inside the passenger compartment, not only is an air conditioning system provided, but the glazing of the bodywork 20 is configured to be mirrored outwardly. Furthermore, the outside of the bodywork 20 is configured at least partially as a display, in order to reproduce advertising information, for example.

The self-driving vehicle 1 is configured with a gauge of less than 1.2 m and therefore belongs to the so-called single-track vehicles. In order to facilitate safe driving on curves in spite of the preferred height of approx. 1.8 m even at comparatively high speeds in the city center area (maximum 70-80 km/h), a tilting technology is provided that tilts the self-driving vehicle 1 towards the inside of the curve as a function of the momentary speed and the curve ahead. FIG. 2c shows the self-driving vehicle 1 at an inclination of approx. 75° to a horizontal H, therefore.

Figure 3A:
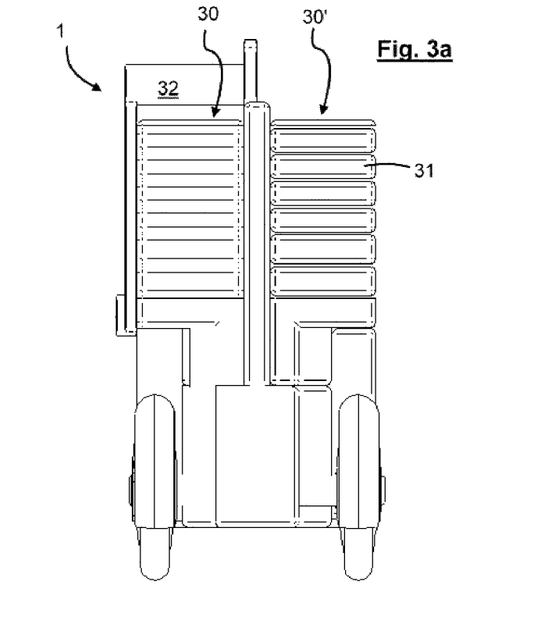
FIG. 3a-c show a self-driving vehicle for transporting parcels and FIG. 4a-c show boxes for receiving parcels.
Figure 3B:
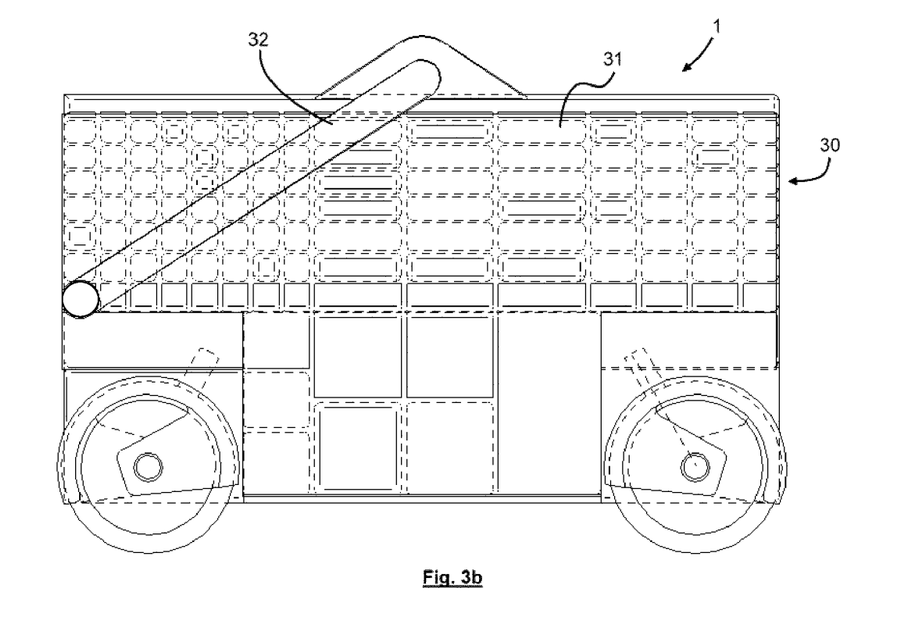
Figure 3C:
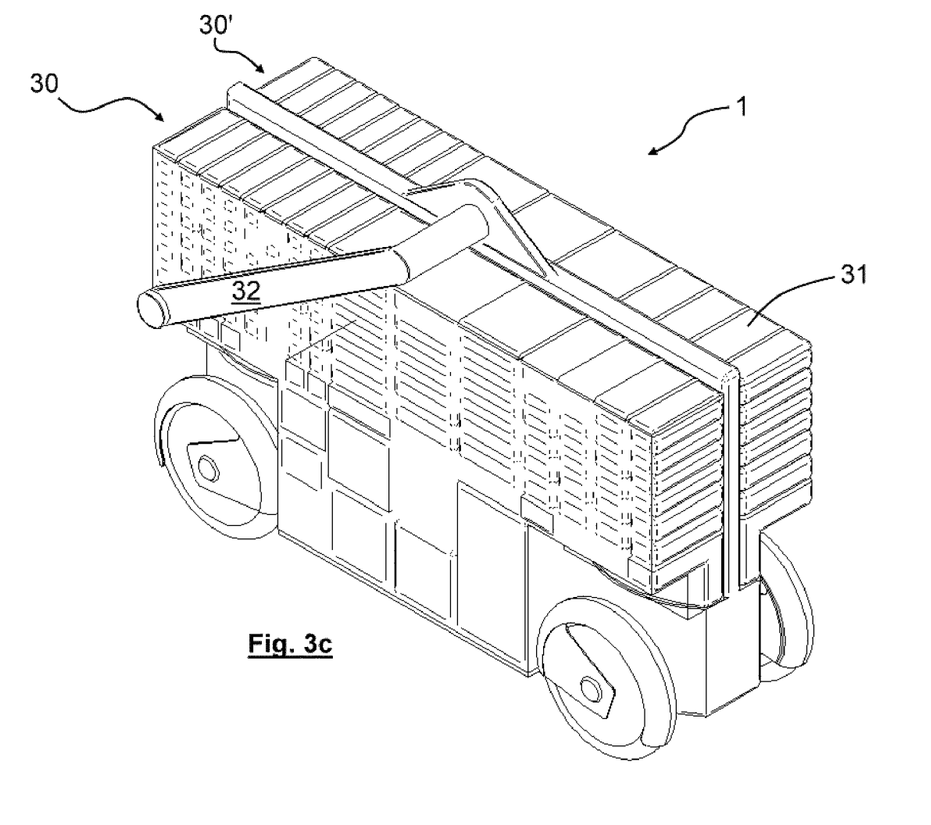

The self-driving vehicle 1 is designed not only for transporting persons, but also for autonomous parcel delivery and other goods deliveries such as groceries or as a pizza taxi etc. FIGS. 3a-c show a self-driving vehicle 1 with the tiltable and steerable wheels, two blocks 30, 30' consisting of transport boxes 31 fixedly connected into a structure, wherein the transport boxes 31 are shown by way of example in different sizes. Furthermore, a robot arm 32 is depicted, which carries out the opening process of individual boxes by means of a universal key following successful identification of the parcel recipient.

Figure 4A:
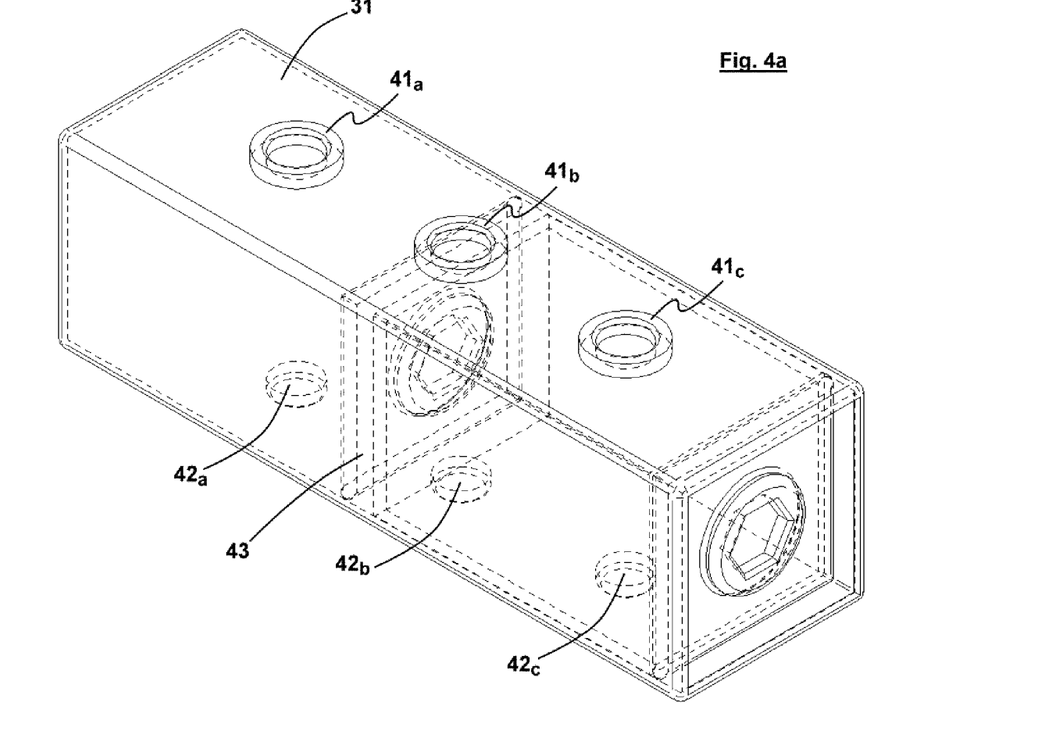
Figure 4B:
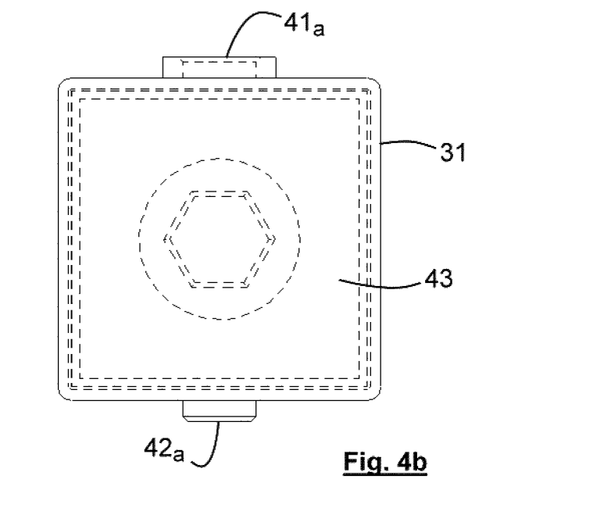
Figure 4C:
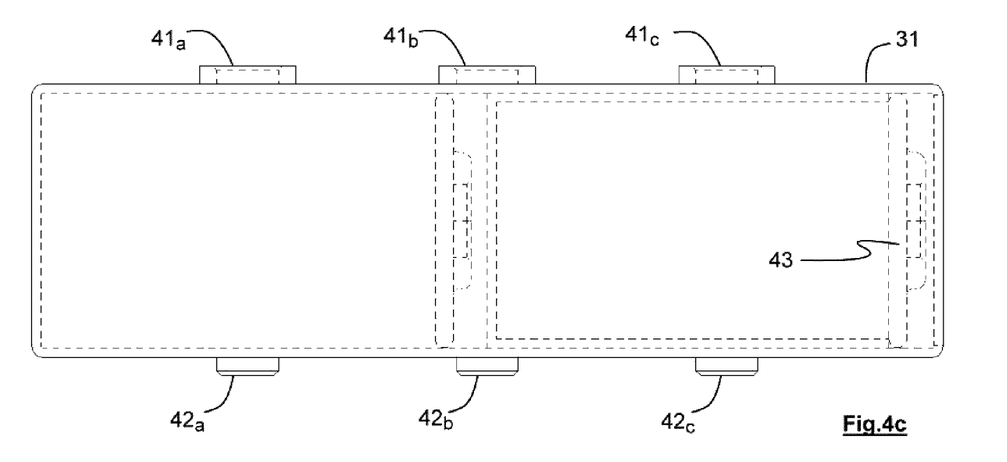

FIGS. 4a-c show a specific exemplary embodiment of a transport box 31, which is connectable detachably to other transport boxes 31 to form a fixed total structure for the delivery of goods. To this end, form-fit elements 41$_{a-c}$ and 44$_{a-c}$ are provided on the top and bottom of the boxes 31, so that the boxes 31 can easily be plugged together. In the exemplary embodiment depicted, the cover 43 in the box 31 can be fixed inside the box 31 at different depths and is configured to be hollow, so that the cover 43 offers space for small items to be transported. For greater clarity no tooth system elements for securing the cover axially and no inflatable air chambers for securing the goods against rattling and slipping are depicted in FIGS. 4a-c.

The invention claimed is:

1. A self-driving vehicle of a fleet of self-driving vehicles of a transport system for transporting persons and/or parcels within a delimited area, the self-driving vehicle comprising:
 a vehicle control system with an onboard unit associated with the self-driving vehicle and a connection to a central computer, which is connected to all self-driving vehicles of the fleet, wherein the driving dynamics of the vehicle are regulated by the onboard unit and the navigation as well as integration of the vehicle into the traffic is controlled both by the onboard unit and by the central computer;
 wherein the width of the vehicle is smaller than 1.2 m so that at least two vehicles can drive in parallel on a lane; whereupon the vehicles have an actuation system and control to compensate for lateral forces in negotiating curves, which system and control permit a tilting of the vehicle parallel to the longitudinal axis.

2. The self-driving vehicle according to claim 1, wherein the width of the vehicle is smaller than 1.0 m, so that at least two vehicles can drive in parallel on a lane.

3. The self-driving vehicle according to claim 1 wherein the vehicle has four wheels and four-wheel steering, wherein the vehicle can drive forwards and backwards at the same speed and with the same autonomous vehicle guidance.

4. The self-driving vehicle according to claim 1, wherein the vehicles are electrically driven,
 whereupon the electric drive motors are arranged in the wheel hubs of the vehicle.

5. The self-driving vehicle according to claim 1, wherein the vehicles have opposing seats, wherein the seats are preferably spaced so that room is arranged for luggage to be transported between the opposing seats.

6. The self-driving vehicle according to claim 1, wherein the vehicles have a chassis and a split bodywork structure, wherein the bodywork parts are movable in a longitudinal direction, so that when the bodywork parts are moved in opposite directions, an opening is created for the boarding and alighting of persons.

7. The self-driving vehicle according to claim 1, further comprising a padded safety crossbar, which is attached to a structural part of the vehicle and is transferable preferably automatically into a position in which the crossbar holds an occupant in the event of an accident, whereupon the padded safety crossbar is activated by an accident early recognition system.

8. The self-driving vehicle according to claim 1, wherein the vehicles have a battery-changing system, whereupon the exchangeable batteries in the charging stations and/or the batteries in the vehicles at times when they are not in driving operation are available for relieving the grid and/or grid balancing and/or as emergency power units in the event of power failures.

9. The self-driving vehicle according to claim 8, further comprising an actuation system, in particular automatic mechatronics as a robot arm or as a linear system that opens the cover, whereupon the boxes can be used as packaging for transport routes to the end customer and/or for transport routes to the retailer and/or to the delivery warehouse, so that secondary packagings are avoidable, whereupon the boxes contain one or more inflatable chambers, which are inflated following filling of the box with the goods to be transported and following the closure of the cover and are deflated on opening of the cover, so that the goods are secured against slipping and rattling, whereupon the assembled blocks of several boxes are held and secured by a frame and/or a strap.

10. The self-driving vehicle according to claim 1, wherein the passenger cabin of the vehicle is semi-mirrored, so that the view from inside outwards is free, while the view from outside inwards is blocked, whereupon information and/or advertising directed outwards is reproduced on a display on the external surface of the passenger cabin without blocking the view of the passenger from inside outwards.

11. The self-driving vehicle according to claim 1, further comprising a system of individual boxes of different or identical size, which each contain only one parcel or only the consignment for one customer and are assembled into a total transport batch using detachable connection means, whereupon the boxes are connected detachably to one another by a form-fit system of spigots and recesses and whereupon the dimensions of the boxes produce an integral matrix system, so that boxes of different size can be joined into blocks without gaps and with a linear outer contour.

12. The self-driving vehicle according to claim 11, wherein the boxes have a cover, which can be opened via a key accessible from outside, whereupon the cover can be latched at different depths of the box via a tooth system and whereupon the cover contains a hollow chamber, which can be used as a further chamber for goods that do not require the total depth of the boxes, wherein a closure system unlocks the cover and hollow chamber in one direction of rotation and in another direction of rotation opens the cover for access to the hollow chamber.

13. The self-driving vehicle according to claim 11, further comprising a blocking system, so that the boxes are only opened following successful proof of identity, in particular after verification via a mobile radio signal, a transponder, an NFC signal (near-field-communication), an RFID signal, an input code, a fingerprint scan or an eye scan, wherein there is arranged for this purpose on the vehicle an input apparatus, via which the presence of the addressee to accept the delivery can be established, whereupon the customers are informed by means of electronic information such as an SMS, an e-mail or by app of the scheduled delivery time, wherein supplementary information is provided about an alternative delivery address and about the current location of the vehicle, whereupon the vehicle facilitates the delivery and acceptance of parcels and/or goods at arbitrary destinations, whereupon a simultaneous exchange of the boxes and the battery of the vehicle is provided, whereupon an external camera is provided, which in the event of disturbances or misuse or attempted theft takes photos and videos of the environment and forwards the recorded data to a central office.

14. A control method of a transport system with a fleet of self-driving vehicles for transporting persons and/or parcels within a delimited area, requesting a self-driving vehicle;
  calculating a journey based on the request via an optimization and management program as an interface between the onboard unit and the central computer;
  wherein a current location of a requesting person is detected and taken into account when determining a route, whereupon a battery of one vehicle of the vehicle fleet of self-driving vehicles is charged and/or exchanged as a function of the route, whereupon the one vehicle stops after the journey at an ideal waiting position as a function of time of day, day of the week and any construction site and/or special event existing, whereupon the one vehicle is released by the requesting person by identification.

\* \* \* \* \*